L. THOMAS.
SIGNALING DEVICE FOR AUTOMOBILES.
APPLICATION FILED MAR. 22, 1917.
1,262,716.
Patented Apr. 16, 1918.
2 SHEETS—SHEET 1.
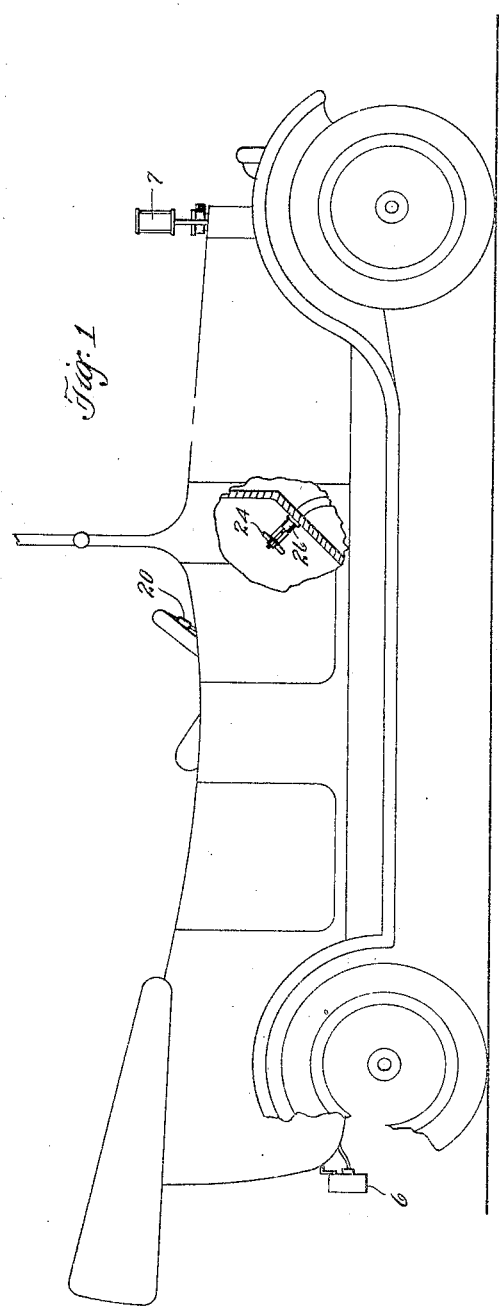
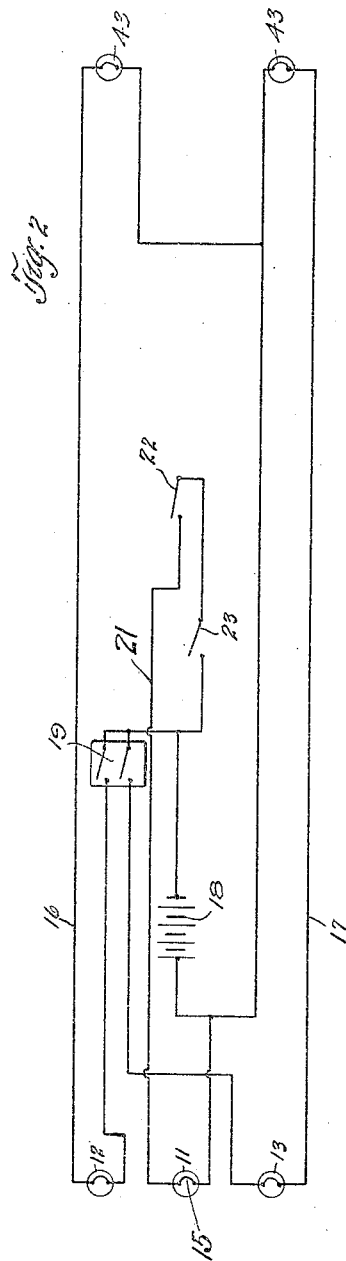
Inventor
LOUIS THOMAS
By John A. Bonnhardt
Attorney

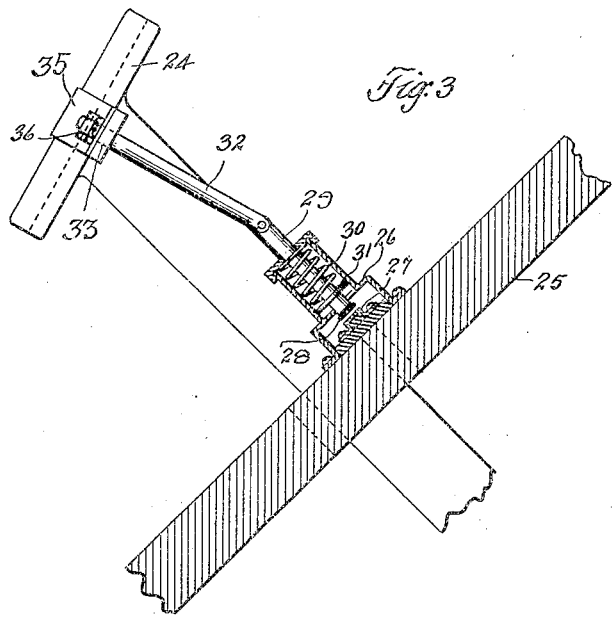

UNITED STATES PATENT OFFICE.

LOUIS THOMAS, OF CLEVELAND, OHIO.

SIGNALING DEVICE FOR AUTOMOBILES.

1,262,716.

Specification of Letters Patent.   Patented Apr. 16, 1918.

Application filed March 22, 1917.   Serial No. 156,518.

*To all whom it may concern:*

Be it known that I, LOUIS THOMAS, a citizen of the United States, residing at Cleveland, in the county of Cuyahoga and State of Ohio, have invented certain new and useful Improvements in Signaling Devices for Automobiles, of which the following is a specification.

This invention relates to signals for automobiles, adapted to give notice to adjacent vehicles or persons of intended movements of the machine carrying the signals.

The device includes a stop signal which is operated by connection to the brake pedal, so that when the brake is applied a stop sign will be shown at the rear.

Various other improvements will be apparent from the following description and the accompanying drawings.

In the drawings Figure 1 is a side view of an automobile provided with the device. Fig. 2 is a diagram of the wiring connections. Fig. 3 is a sectional view showing the contact pieces connected to the brake pedal.

Referring specifically to the drawings, 6 indicates a rear sign box and 7 the front sign box, the latter being clamped to the filling neck 8 on the radiator.

The lamps in the left and right compartments 12 and 13 are in circuits 16 and 17 respectively with a battery 18, each circuit containing a switch 19 which may be of the push button type, conveniently mounted on a casing 20 attached to the steering wheel. It is intended that these lights shall be operated by hand, by closing the appropriate switch and lighting the corresponding lamp, to indicate an intended turn to the right or the left.

The lamp 15 in the "stop" compartment 11 is in a circuit 21 with the battery, and with a pedal switch 22, and a cut-out switch 23. The operation of the pedal switch 22 is automatic with the movement of the brake 24, and the details are shown in Fig. 3.

On the foot board 25 of the car is mounted a tubular casing 26 the lower part of which incloses a fixed contact piece 27 in the circuit 21. Coöperating with this contact piece is another contact 28 also in said circuit, and the latter contact is carried at the lower end of a plunger rod 29. A coiled spring 30 is inclosed in the casing, and presses against a collar on the plunger, and tends to force the plunger down and close the contacts and thereby light the lamp 15 in the rear compartment 11. The upper end of the plunger 29 is connected to a link 32 which works loosely through a hole 33 in a bracket 34 fixed to the under side of the brake pedal 34 by a clip 35. The link rod 32 has a stop nut 36 on the upper end thereof.

As well known the brake pedal is normally lifted by the brake spring when the brakes are released, and the adjustment of are link 32 is such that when the pedal is lifted the plunger 29 is pulled up and the contacts 26 and 27 are separated. When the pedal is pressed down in applying the brakes, the spring 30 pushes down the plunger 29 and closes the contacts thereby lighting the lamp in the compartment 11 and showing the stop signal at the rear. As the link 32 works loosely through the hole 33 further downward movement of the pedal is permitted. When the pedal is released the plunger 29 is again pulled up and the lamp circuit opened.

By the means described any intended change of movement of the vehicle can be exhibited to other adjacent vehicles, whereby the danger of collisions is avoided, and the apparatus may be applied to existing cars without material change of structure.

I claim:

In a switch, the combination of a vehicle brake pedal, abutting switch contacts, a spring pressed plunger carrying one of the switch contacts and tending to close the switch, and a link rod between the plunger and the pedal, said link rod having a sliding connection with the pedal permitting relative movement between the pedal and the plunger, to take up excessive movement of the pedal after the switch is closed.

In testimony whereof, I do affix my signature in presence of two witnesses.

LOUIS THOMAS.

Witnesses:
JOHN A. BOMMHARDT,
G. W. ROSENBERG.